US010801164B2

(12) United States Patent
Andersson et al.

(10) Patent No.: US 10,801,164 B2
(45) Date of Patent: Oct. 13, 2020

(54) TOOL OR TOOL PART, SYSTEM INCLUDING SUCH A TOOL OR TOOL PART, METHOD OF PRODUCING SUCH A TOOL OR TOOL PART AND METHOD OF MOLDING A PRODUCT FROM A PULP SLURRY

(71) Applicant: Celwise AB, Norrkoping (SE)

(72) Inventors: John Andersson, Norrkoping (SE); Udo Vogt, Baden-Baden (DE); David A. Pierce, Norrkoping (SE)

(73) Assignee: Celwise AB, Norrkoping (SE)

( * ) Notice: Subject to any disclaimer, the term of this patent is extended or adjusted under 35 U.S.C. 154(b) by 0 days.

(21) Appl. No.: 16/548,421

(22) Filed: Aug. 22, 2019

(65) Prior Publication Data
US 2019/0376239 A1 Dec. 12, 2019

Related U.S. Application Data

(62) Division of application No. 15/537,706, filed as application No. PCT/EP2014/079005 on Dec. 22, 2014, now Pat. No. 10,435,848.

(51) Int. Cl.
*D21J 7/00* (2006.01)
*D21J 3/00* (2006.01)
*D21J 5/00* (2006.01)
*B22F 3/11* (2006.01)
*B22F 5/00* (2006.01)
*B22F 7/06* (2006.01)
*B29C 33/38* (2006.01)
*B29C 45/27* (2006.01)

(52) U.S. Cl.
CPC .............. *D21J 7/00* (2013.01); *B22F 3/1109* (2013.01); *B22F 5/007* (2013.01); *D21J 3/00* (2013.01); *D21J 5/00* (2013.01); *B22F 7/064* (2013.01); *B29C 33/3814* (2013.01); *B29C 45/2738* (2013.01)

(58) Field of Classification Search
CPC ........ D21J 7/00; D21J 3/00; D21J 5/00; D21J 3/10; B22F 5/007; B22F 2207/17; B22F 3/1109; B22F 7/064; B29C 33/3814; B29C 45/2738; B29C 43/52; B29C 51/10
See application file for complete search history.

(56) References Cited

U.S. PATENT DOCUMENTS

| | | |
|---|---|---|
| 1,709,338 A | 4/1929 | Chaplin |
| 1,793,089 A | 2/1931 | Heyes |
| 2,377,864 A | 6/1945 | Chaplin |
| 2,927,635 A | 3/1960 | Crane |
| 2,990,314 A | 6/1961 | Leitzel |
| 3,067,470 A | 12/1962 | Stickney et al. |
| 3,075,872 A | 1/1963 | Reifers |
| 3,161,705 A | 12/1964 | Kindseth et al. |
| 3,261,740 A | 7/1966 | Roger |
| 3,284,284 A | 11/1966 | Roger |
| 4,014,737 A * | 3/1977 | Brennan ............ D21J 3/12 162/226 |
| 5,356,518 A * | 10/1994 | Kelley ............ D21J 5/00 162/223 |
| 5,399,243 A | 3/1995 | Miyamoto et al. |
| 5,431,784 A | 7/1995 | Miyamoto et al. |
| 5,603,808 A | 2/1997 | Nishikawa |
| 5,685,956 A | 11/1997 | Greve |
| 5,745,971 A | 5/1998 | Ohsawa et al. |
| 5,795,443 A | 8/1998 | Greve |
| 6,210,531 B1 * | 4/2001 | Bradford ............ B29C 43/56 162/218 |
| 6,461,480 B1 * | 10/2002 | Otakura ............ D21J 3/10 162/220 |
| 6,468,398 B1 * | 10/2002 | Kumamoto ............ D21J 3/10 162/220 |
| 6,576,089 B1 * | 6/2003 | Sato ............ D21J 3/10 162/227 |
| 6,645,348 B2 * | 11/2003 | Kumamoto ............ D21J 3/10 162/220 |
| 6,752,910 B2 * | 6/2004 | Sato ............ D21J 3/10 162/396 |
| 9,149,948 B2 | 10/2015 | Kuo et al. |
| 9,650,746 B2 | 5/2017 | Kuo et al. |
| 9,739,016 B2 | 8/2017 | Kuo et al. |

(Continued)

FOREIGN PATENT DOCUMENTS

| | | |
|---|---|---|
| CN | 1099830 A | 3/1995 |
| CN | 101111641 A | 1/2008 |

(Continued)

OTHER PUBLICATIONS

Decision to Grant a Patent issued in Japanese Patent Application No. 2017-050981 dated Feb. 26, 2019 (thirteen (13) pages).
First Office Action issued in counterpart Chinese Application No. 2014800842934 dated Aug. 2, 2018 (fifteen (15) pages).
International Preliminary Report on Patentability issued in PCT/EP2014/079005 dated Jul. 17, 2017 (nine (9) pages).
International Search Report and Written Opinion for PCT/EP2014/079005 dated Sep. 11, 2015.
Office Action issued in Japanese Application No. 2017-550981 dated Jul. 3, 2018 (nine (9) pages).
Second Office Action issued in counterpart Chinese Application No. 2014800842934 dated Apr. 22, 2019 (five (5) pages).

(Continued)

*Primary Examiner* — Jose A Fortuna
(74) *Attorney, Agent, or Firm* — Olive Law Group, PLLC

(57) ABSTRACT

The present document discloses a tool or tool part for use in a process of molding a product from a pulp slurry. The tool or tool part comprises a self-supporting tool wall portion having a product face, for contacting the product, and a back face on the other side of the wall relative to the product face. The tool wall portion presenting pores, which are provided by a plurality of channels extending through the tool wall portion, from the product face to the back face. The channels are straight or curved with no more than one point of inflection.

5 Claims, 4 Drawing Sheets

(56) References Cited

U.S. PATENT DOCUMENTS

| | | | |
|---|---|---|---|
| 9,803,322 B2 | 10/2017 | Kuo et al. | |
| 9,856,608 B1 | 1/2018 | Chung et al. | |
| 10,435,848 B2* | 10/2019 | Andersson | D21J 3/00 |
| 2003/0111201 A1* | 6/2003 | Sato | D21J 3/10 |
| | | | 162/382 |
| 2007/0164041 A1 | 7/2007 | Pierce et al. | |
| 2009/0139678 A1 | 6/2009 | Nilsson et al. | |
| 2009/0283526 A1 | 11/2009 | Pierce et al. | |
| 2009/0291531 A1 | 11/2009 | Sato | |
| 2016/0168793 A1 | 6/2016 | Kuo et al. | |
| 2016/0168800 A1 | 6/2016 | Kuo et al. | |
| 2016/0168801 A1 | 6/2016 | Kuo et al. | |
| 2016/0244917 A1 | 8/2016 | Kuo et al. | |
| 2016/0368235 A1 | 12/2016 | Kuo et al. | |
| 2017/0226699 A1 | 8/2017 | Halvardsson et al. | |
| 2017/0370049 A1* | 12/2017 | Andersson | D21J 3/00 |
| 2018/0187379 A1 | 7/2018 | Sundblad et al. | |
| 2019/0169800 A1* | 6/2019 | Hardacre | D21J 3/10 |
| 2019/0194870 A1 | 6/2019 | Kuo et al. | |
| 2019/0284764 A1 | 9/2019 | Kuo et al. | |
| 2019/0301102 A1 | 10/2019 | Kuo et al. | |
| 2019/0376239 A1* | 12/2019 | Andersson | B22F 3/1109 |

FOREIGN PATENT DOCUMENTS

| | | |
|---|---|---|
| CN | 101593708 A | 12/2009 |
| CN | 102713061 A | 10/2012 |
| CN | 204849488 U | 12/2015 |
| CN | 205443807 U | 8/2016 |
| CN | 205688279 U | 11/2016 |
| EP | 0559490 A1 | 9/1993 |
| EP | 0559491 A1 | 9/1993 |
| EP | 0728868 A2 | 8/1996 |
| GB | 468622 A | 7/1937 |
| GB | 2456502 A | 7/2009 |
| JP | 0742100 A | 2/1995 |
| JP | H08197553 A | 8/1996 |
| JP | 08239606 | 9/1996 |
| JP | H08260400 A | 10/1996 |
| JP | H09300446 A | 11/1997 |
| JP | H09324399 A | 12/1997 |
| JP | 2008522044 A | 6/2008 |
| JP | 2009283870 A | 12/2009 |
| JP | 2013129921 A | 7/2013 |
| KR | 20190000074 U | 1/2019 |
| RU | 2007119434 A | 1/2009 |
| TW | M511949Y U | 11/2015 |
| TW | M515462Y U | 1/2016 |
| TW | M515566Y U | 1/2016 |
| TW | M519157Y U | 3/2016 |
| TW | 201711926 A | 4/2017 |
| TW | I621751 B | 4/2018 |
| WO | 9722755 A1 | 6/1997 |
| WO | 0058556 A1 | 12/2000 |
| WO | 2006057609 A1 | 6/2006 |
| WO | 2006057610 A2 | 6/2006 |
| WO | 2006057611 A1 | 6/2006 |
| WO | 2007084067 A1 | 7/2007 |
| WO | 2007106026 A1 | 9/2007 |
| WO | 2007129972 A1 | 11/2007 |
| WO | 2009132318 A1 | 10/2009 |
| WO | 2010124300 A1 | 10/2010 |
| WO | 2011059391 A1 | 5/2011 |
| WO | 2011059392 A1 | 5/2011 |
| WO | 2011059393 A1 | 5/2011 |
| WO | 2011059394 A1 | 5/2011 |
| WO | 2011065911 A1 | 6/2011 |
| WO | 2011159240 A1 | 12/2011 |
| WO | 12005683 A1 | 1/2012 |
| WO | 12033449 A1 | 3/2012 |
| WO | 2014/051447 A1 | 4/2014 |
| WO | 2016101976 A1 | 6/2016 |

OTHER PUBLICATIONS

Extended European Search Report for European Patent Application No. 20151612.7 dated Feb. 26, 2020.
Office Action for Japanese Patent Application No. 2019-071828 dated Mar. 24, 2020.
Japanese Patent JPH606128900 dated May 10, 1994.
English translation for TW201711926 abstract, published Apr. 1, 2017, 1 page.
English translation for TWM515566Y claims, published Jan. 11, 2017, translation accessed May 29, 2020, 2 pages.
English translation for TWM515566Y description, published Jan. 11, 2017, translation accessed May 29, 2020, 7 pages.
English translation for TWM511949Y claims, published Nov. 11, 2015, translation accessed May 29, 2020, 3 pages.
English translation for TWM511949Y description, published Nov. 11, 2015, translation accessed May 29, 2020, 15 pages.
English translation for KR20190000074 claims, published Jan. 8, 2019, translation accessed May 29, 2020, 2 pages.
English translation for KR20190000074 description, published Jan. 8, 2019, translation accessed May 29, 2020, 5 pages.
English translation for CN205443807 claims, published Aug. 10, 2016, translation accessed May 29, 2020, 3 pages.
English translation for CN205443807 description, published Aug. 10, 2016, translation accessed May 29, 2020, 13 pages.
English translation for CN204849488 claims, published Dec. 9, 2015, translation accessed May 29, 2020, 2 pages.
English translation for CN204849488 description, published Dec. 9, 2015, translation accessed May 29, 2020, 5 pages.
English translation for TWI621751 claims, published Apr. 21, 2018, translation accessed May 29, 2020, 1 page.
English translation for TWI621751 claims, published Apr. 21, 2018, translation accessed May 29, 2020, 5 pages.
English translation for CN205688279 claims, published Nov. 16, 2016, translation accessed May 29, 2020, 2 pages.
English translation for CN205688279 description, published Nov. 16, 2015, translation accessed May 29, 2020, 4 pages.
English translation for TWM515462 claims, published Jan. 11, 2016, translation accessed May 29, 2020, 2 pages.
English translation for TWM515462 description, published Jan. 11, 2016, translation accessed May 29, 2020, 2 pages.

* cited by examiner

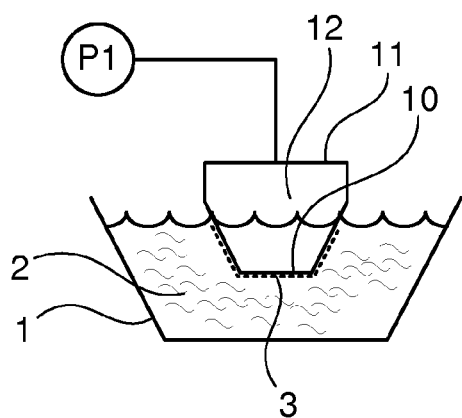
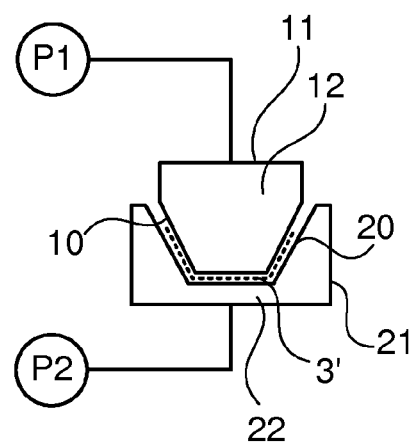
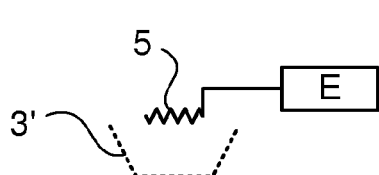
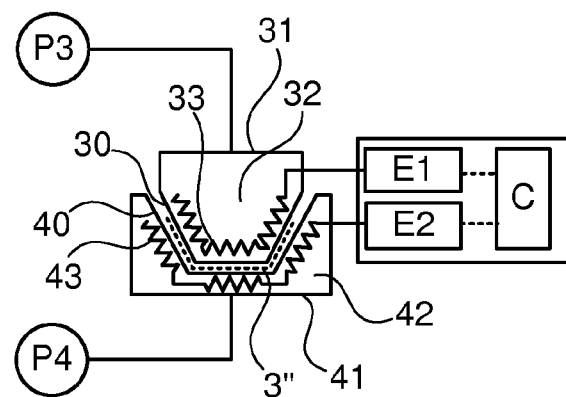
Fig. 1a
Fig. 1b
Fig. 1c
Fig. 1d

TOOL OR TOOL PART, SYSTEM INCLUDING SUCH A TOOL OR TOOL PART, METHOD OF PRODUCING SUCH A TOOL OR TOOL PART AND METHOD OF MOLDING A PRODUCT FROM A PULP SLURRY

CROSS REFERENCE TO RELATED APPLICATIONS

This application is a divisional patent application of U.S. Non-Provisional patent application Ser. No. 15/537,706 (now U.S. Pat. No. 10,435,848), filed on Jun. 19, 2017, which is a 35 USC 371 application of International PCT Patent Application No. PCT/EP2014/079005, filed on Dec. 22, 2014; the contents of which are hereby incorporated by reference herein in their entireties.

This application is related to U.S. Non-Provisional patent application Ser. No. 16/548,304, filed simultaneously herewith, and titled TOOL OR TOOL PART, SYSTEM INCLUDING SUCH A TOOL OR TOOL PART, METHOD OF PRODUCING SUCH A TOOL OR TOOL PART AND METHOD OF MOLDING A PRODUCT FROM A PULP SLURRY.

TECHNICAL FIELD

The present disclosure relates to tools or tool parts for use in molding a product from slurry. The disclosure also relates to a method of producing such a tool, and to various uses of such tools or tool parts.

BACKGROUND

It is known to mold products from a pulp slurry by dipping a porous mold into a pulp slurry and subsequently drying and optionally pressing the thus molded product. Examples of such products are egg cartons, shock absorbing packaging inserts and paper trays, paper cups, drink carry out trays, mushroom and berry boxes and other forms of industrial, agricultural and consumer packaging.

Porous pulp molding dies have been made of a woven wire cloth material, which is stretched to conform to a die surface. Such dies have some disadvantages in terms of the amount of distortion or stretching of which the wire cloth is capable to enable it to conform to the die surface. Further disadvantages include the propensity of the wire cloth to rupture. The use of wire cloth is also associated with some limitations on the complexity of the products that can be molded. In particular, when forming a wire cloth into a mold, the pores of the wire cloth will be deformed, and so it is not possible to control the distribution of the openings.

Yet another disadvantage is the cost of making such molds: as the wire cloth is typically not self supporting, it will be necessary to provide also a metal backing which is specific for the product that is to be molded. The tools are moreover prone to clogging and difficult to repair.

It is also known, from e.g. U.S. Pat. No. 3,067,470, to provide a porous pulp molding die from small spherical bodies, which are sintered together so as to provide a porous body. The bodies may be made from polymer material as disclosed in U.S. Pat. No. 3,067,470. However, dies of this type suffer not only from disadvantages in terms of strength and limited temperature range in which they may be used. They also suffer from a trade-off between surface quality and pressure drop: the finer the particles used at the surface, the smaller the channels will be and thus the greater the pressure drop.

WO2011059391A1 discloses a method of making a pulp molding die by sintering together particles of a metallic material, such as bronze. While such a die may withstand higher temperatures as compared to the polymer based die, its manufacturing is associated with a more difficult sintering process, as higher temperatures are required. Moreover, the finished die suffers from the same advantages as that made of polymer material.

Hence, several challenges remain with respect to the molding of products from pulp: It would be desirable to provide smoother surface structures, to reduce energy consumption, to provide a less expensive process for making the mold and to provide a mold that is durable and can be subjected to elevated temperatures. There is also a desire to provide improved quality control of the forming process.

SUMMARY

It is an object of the present disclosure to provide an improved mold for molding a product from a pulp slurry.

The invention is defined by the appended independent claims with embodiments being set forth in the appended dependent claims, in the following description and in the drawings.

According to a first aspect, there is provided a tool or tool part for use in a process of molding a product from a pulp slurry. The tool or tool part comprises a self-supporting tool wall portion having a product face, for contacting the product, and a back face on the other side of the wall relative to the product face. The tool wall portion presents pores, which are provided by a plurality of channels extending through the tool wall portion, from the product face to the back face. The channels are straight or curved with no more than one point of inflection.

For the purpose of the present disclosure, the term "pulp" should be construed so as to include materials comprising fibers such as cellulose, minerals and starch and combinations of these materials. The pulp preferably has a liquid carrier, which may comprise water.

The term "self supporting" means that the tool wall portion is sufficiently rigid and has a melting point that is sufficiently high for the tool wall portion not to require any support structure for maintaining its shape during operation.

The product face may be a molding face in a slurry pickup tool, a contact face in a transfer tool or a molding face in a male or female pressing tool.

A curved channel may be curved in one or more planes.

A tool or tool part according to the inventive concept is capable of providing efficient pickup, transfer or evaporation of pulp used or molding the product, while requiring less energy for vacuum generation as compared to prior art.

The tool or tool part may have a product face that presents a planar surface portion and a convex surface portion.

A convex surface portion may be convex in one or two mutually perpendicular planes.

A tool wall may present a thickness that is smaller at the convex surface portion than at the planar surface portion, preferably 30-70% smaller or 40-60% smaller.

The convex surface portion may present greater porosity than the planar surface portion.

Hence, vacuum is provided where needed.

The product surface may present a planar surface portion and a concave surface portion.

The planar surface portion may present greater porosity than the concave surface portion.

A concave surface portion may be concave in one or two mutually perpendicular planes.

The product surface may have a pair of surface portions which are substantially planar and present an angle of 45°-135° to each other, wherein the surface portion presenting the greatest angle to a horizontal plane during a principal operation of the tool or tool part presents greater porosity than the other surface portion.

The "principal operation of the tool" is understood as that part of the tool's operation during which it performs its principal function in relation to the product that is to be molded. Hence, for a pickup tool, the principal function will be performed in the position when pulp is being picked up by means of an applied vacuum. For a transfer tool, the principal operation will be performed at the point when the pulp is being transferred from the pickup tool to the transfer tool. For a pressing tool, the principal operation will be the pressing operation.

At least some of the channels may present a channel opening area at the product face that is smaller than a corresponding channel opening area at the back face.

Hence, the risk of clogging is reduced.

At least some of the channels may present a cross section which tapers towards the product face.

At least some of the channels may present a central axis, which extends at an angle of 40-90 degrees relative to the product surface.

At least some of the channels may present a curved central axis.

The product surface may present first and second juxtaposed surface portions, and central axes of channels opening at the first surface portion may extend at a different angle relative to the product face of the surface portion at which they open than central axes of channels opening at the second surface portion.

A void volume inside the tool or tool part may be at least 20%, preferably at least 40%, at least 60% or at least 80% of a total volume spanned by the tool or tool part.

Void volume is volume made up of void, i.e. not of heaters, support bodies or the like.

Hence, enhanced distribution of vacuum to the product face is achieved, which, in turn, reduced the need for vacuum power.

At least some of the channels may present a length which exceeds a wall thickness near the channel.

Product face openings of at least some of the channels may have a cross section having a greatest width of 0.1-2 mm.

At least some of the channels may present at least one branch situated between the product face and the back face.

The tool walls have a thickness of 0.2-20 mm, preferably 0.3-15 mm or 0.5-10 mm.

The tool wall portion may be formed as a homogenous piece of material, with less than 95%, preferably less than 99% or less than 99.9%, voids between channels.

The tool or tool part may be formed of a material and with a wall thickness that are sufficient for the tool or tool part to be self supporting during operation.

The back face of the tool may be at least 50%, preferably at least 70% or at least 90%, exposed to a chamber that is adapted for providing an air pressure other than ambient pressure.

The tool or tool part may form part of a tool selected from a group consisting of:

a pickup tool for picking up pulp from a pulp slurry, a transfer tool for receiving an amount of pulp from another tool, and a pressing tool for pressing an amount of pulp to form a molded product.

The tool or tool part may comprise at least two tool wall portions which are interconnectable, preferably moveably interconnectable.

According to a second aspect, there is provided a system for molding a product from a pulp slurry, comprising at least one tool or tool part as described above, means for applying pulp to the product face, and means for drawing a vacuum and/or applying a pressure greater than ambient air pressure at the rear face.

The system may further comprise a heating element, which is arranged on a rear side of the tool wall portion and adapted to supply heat to the tool wall portion.

The heating element may be arranged in a heater portion, which is spaced from the tool wall portion.

The heater portion may be formed in one piece with the tool wall portion.

The heater portion may be formed by a separate part, contacting the tool wall portion via at least one spacer element.

The separate part may be formed from a different material than the tool wall portion. The spacer element may be integrally formed with the tool wall portion or with the heater portion. Preferably the spacer element(s) is positioned so as not to block any of the channels. This may be facilitated by forming the spacer elements on the rear face of the tool wall portion.

As an alternative, the heating element may be integrated with the tool wall portion.

For example, the heating element may be recessed in the rear face of the tool wall portion.

According to a third aspect, there is provided a method of producing a tool or tool part for molding a product from a pulp slurry, comprising providing particles of a material from which the tool or tool part is to be formed, successively dispensing a plurality of layers of said particles at a target surface, and directing an energy source at locations of each dispensed layer of particles at the target surface corresponding to cross-sections of the tool or tool part to be produced therein, such that the powder particles are fused together.

The method may further comprise forming a tool wall portion having pores provided by a plurality of channels extending through the tool wall portion, from a product face to a back face, wherein the channels are straight or curved with no more than one point of inflection.

According to a fourth aspect, there is provided a method of molding a product from a pulp slurry, the method comprising providing a mold as described above, applying a vacuum to the rear face of the mold, and applying pulp slurry to the product face of the mold.

The method may further comprise using the mold for picking up the pulp slurry from a slurry container.

The method may further comprise using the mold for pressing the pulp slurry to form the product, whereby at least some solvent is removed from the pulp slurry.

BRIEF DESCRIPTION OF THE DRAWINGS

FIGS. 1a-1d schematically illustrate a process for forming a product from a pulp slurry.

DETAILED DESCRIPTION

Figure 2A:
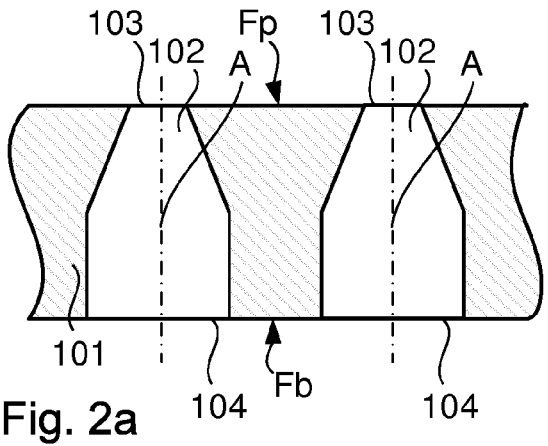
FIGS. 2a-2e schematically illustrate mold wall portions having different channel designs.

FIG. 1a schematically illustrates a pickup tool 10 which is partially immersed in container 1 holding a pulp slurry 2. The pickup tool is mounted to a tool holder 11, which together with the pickup tool defines a vacuum chamber 12 that is connected to a pressure regulator P1. The pressure regulator may have the capability of selectively generating an at least partial vacuum (i.e. air pressure lower than ambient air pressure) and/or an air pressure greater than ambient air pressure.

While the pickup tool is immersed in the pulp slurry 2, the pressure regulator P1 may generate a vacuum, causing pulp fibers 3 to stick to a product face of the pickup tool 10.

FIG. 1b schematically illustrates the pickup tool 10 transferring the pulp fibers 3 to a transfer tool 20. The transfer tool may be connected to a second pressure regulator P2, which is capable of generating a vacuum or an air pressure. The transfer tool may also be mounted on a transfer tool holder 21 so as to define a vacuum chamber 22, which is connected to the second pressure regulator.

During the transfer of the pulp fibers 3 from the pickup tool to the transfer tool, an air pressure greater than ambient pressure may be generated by the first pressure regulator P1 to cause the pulp fibers to release from the pickup tool.

Alternatively, or a as a supplement, a vacuum may be generated by the second pressure regulator P2, causing the pulp fibers to be received by the transfer tool 20.

FIG. 1c schematically illustrates a drying arrangement comprising a heat 5 generator and an energy supply E. The drying arrangement may be used to remove a sufficient amount of water from the pulp 3 to condition it for further treatment and/or to finish the forming of the product 3'.

FIG. 1d schematically illustrates a pressing arrangement comprising a male pressing tool 30 and a female pressing tool 40. One, or both, of the pressing tools may be mounted on a respective tool holder 31, 41 and be connected to a respective vacuum chamber 32, 42. The vacuum chambers may be connected to a respective pressure regulator P3, P4.

One, or both, of the pressing tools may be provided with a heating element 33, 43, energized by an energy supply E1, E2 and optionally controlled by a controller C. The heating may be achieved by electric heating elements, hot air or liquid or induction.

The pressing tools and their associated tool holders may be movable relative one another between an open position, wherein a partially molded pulp product may be inserted, and a pressing position, wherein the pressing tools are forced towards each other thus pressing the product 3" between product faces of the respective tool 30, 40.

When in the pressing position, heat may be supplied by one, or both, of the heaters 33, 43.

During the pressing step, one or both pressure regulators P3, P4 may provide a vacuum to assist in the evacuation of water vapor from the product 3".

As an alternative, one of the pressure regulators may provide a vacuum while the other one provides a pressure greater than the ambient air pressure.

Optionally, hot air or steam may be introduced through the molds during the pressing process (FIG. 1d).

It is noted that two or more successive pressing steps may be used, e.g. to gradually form all or parts of the product 3" and/or to apply additional features to the product, such as coatings, decors and the like.

In one embodiment, steps are performed in accordance with what has been described with respect to FIGS. 1a, 1b and 1d.

In one embodiment, the pickup tool 10 may transfer the pulp fibers directly to a drying arrangement. Such transfer may be assisted by the first pressure regulator P1 generating an air pressure greater than the ambient air pressure. Hence, in this embodiment, steps are performed in accordance with what has been described with respect to FIGS. 1a and 1c only.

In another embodiment, the pickup tool 10 may be used also as a pressing tool. Hence, in this embodiment, steps are performed in accordance with what has been described with respect to FIGS. 1a and 1d only.

FIGS. 2a-2e schematically illustrate mold wall portions having different channel designs. The mold walls all have a product face Fp and a back face Fb. The product face is that face of the mold which will contact the product and the back face is the opposite face of the mold wall. The back face may typically define part of a vacuum chamber.

The mold walls may have a thickness of 0.25 to 10 mm, preferably 0.5 to 5 mm. The wall thickness may vary between different parts of the tool. Also, tools having different functions may have different thicknesses.

The channels connect the product face with the back face Fb. A channel's product face opening area may, but need not, be smaller than the channel's back face opening area. The channel may thus have a cross sectional area which diminishes from the back face towards the product face.

The channels present a central axis, which may be defined as a line or curve which runs through the center of gravity of each channel cross section taken in parallel with the product face Fp.

FIG. 2a schematically illustrates a pulp mold wall portion having a pair of channels of the same size and configuration. The channels present a respective first channel portion having a constant channel cross section and a respective second channel portion having a tapering cross section.

Figure 2B:
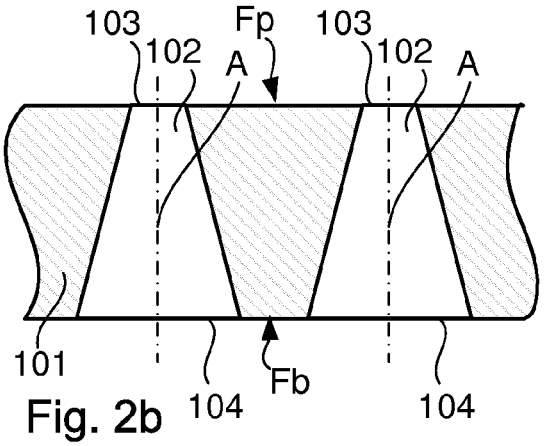

FIG. 2b schematically illustrates a pulp mold wall portion having a pair of channels which are continuously tapering from the back face towards the product face Fp.

The channels of FIGS. 2a and 2b and their respective central axes extend perpendicular to the product face Fp.

Figure 2C:
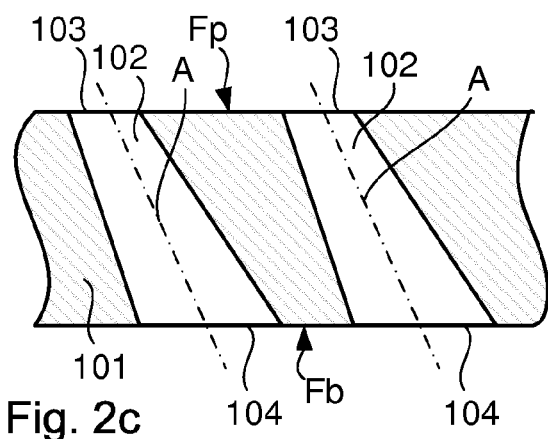

FIG. 2c schematically illustrate a pulp mold wall portion having channels, the central axes of which extend at an angle other than a right angle relative to the product face Fp. This angle may be in the interval 20-90, preferably 30-90 or 60-90.

The channels of FIG. 2c may have a constant cross sectional area, or a cross sectional area which diminishes towards the product face Fp.

A mold wall portion may present channels extending at different angles within said intervals.

Figure 2D:
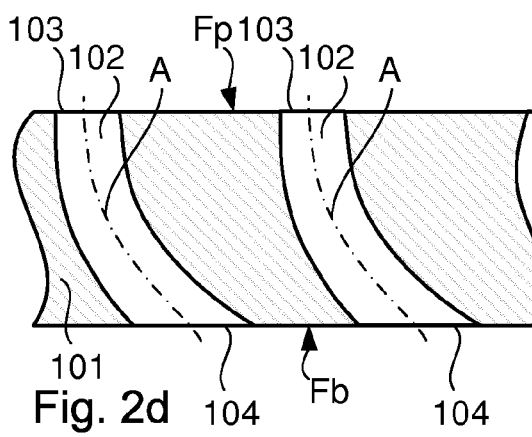

FIG. 2d schematically illustrates a pulp mold wall portion having curved channels. Specifically, such curved channels may be curved in one plane, as illustrated, or in two orthogonal planes.

The channels of FIG. 2d may have a constant cross sectional area, or a cross sectional area which diminishes towards the product face Fp.

Figure 2E:
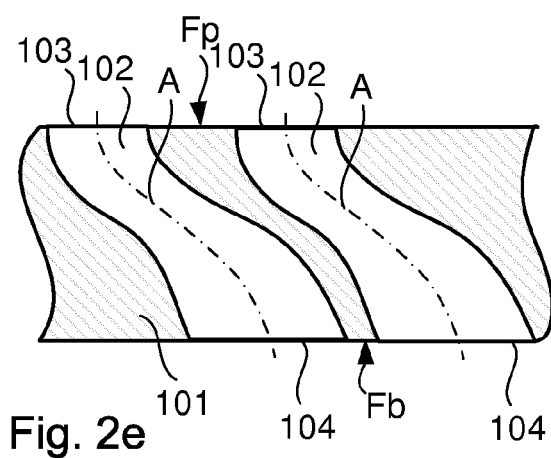

FIG. 2e schematically illustrates a pulp mold wall portion having curved channels with one point of inflection. Such curved channels may be curved in one plane, as illustrated, or in two orthogonal planes.

The channels of FIG. 2e may have a constant cross sectional area, or a cross sectional area which diminishes towards the product face Fp.

It is noted that one mold may present channels which are formed according to one or more of FIGS. 2a-2e. In particular, the mold may comprise at least one wall portion comprising channels formed according to any one of FIGS. 2a-2e and another wall portion comprising channels formed according to another one of FIGS. 2a-2e.

Referring to FIGS. 2d and 2e, a bending radius of the channels may be greater than ½ of the wall thickness at the channel, preferably greater than ¾ of the wall thickness or greater than 1/1 of the wall thickness of the channel.

It is noted that the channels may present cross sections which vary over the length of the channel. A channel may present at least a portion which has a cross section that is circular, elliptic or polygonal, such as square, triangular, pentagonal, hexagonal, heptagonal, octagonal, nonagonal, decagonal, hendecagonal, dodecagonal or other multi sided shapes with interior angles from 60° up to 180°.

Figure 3:
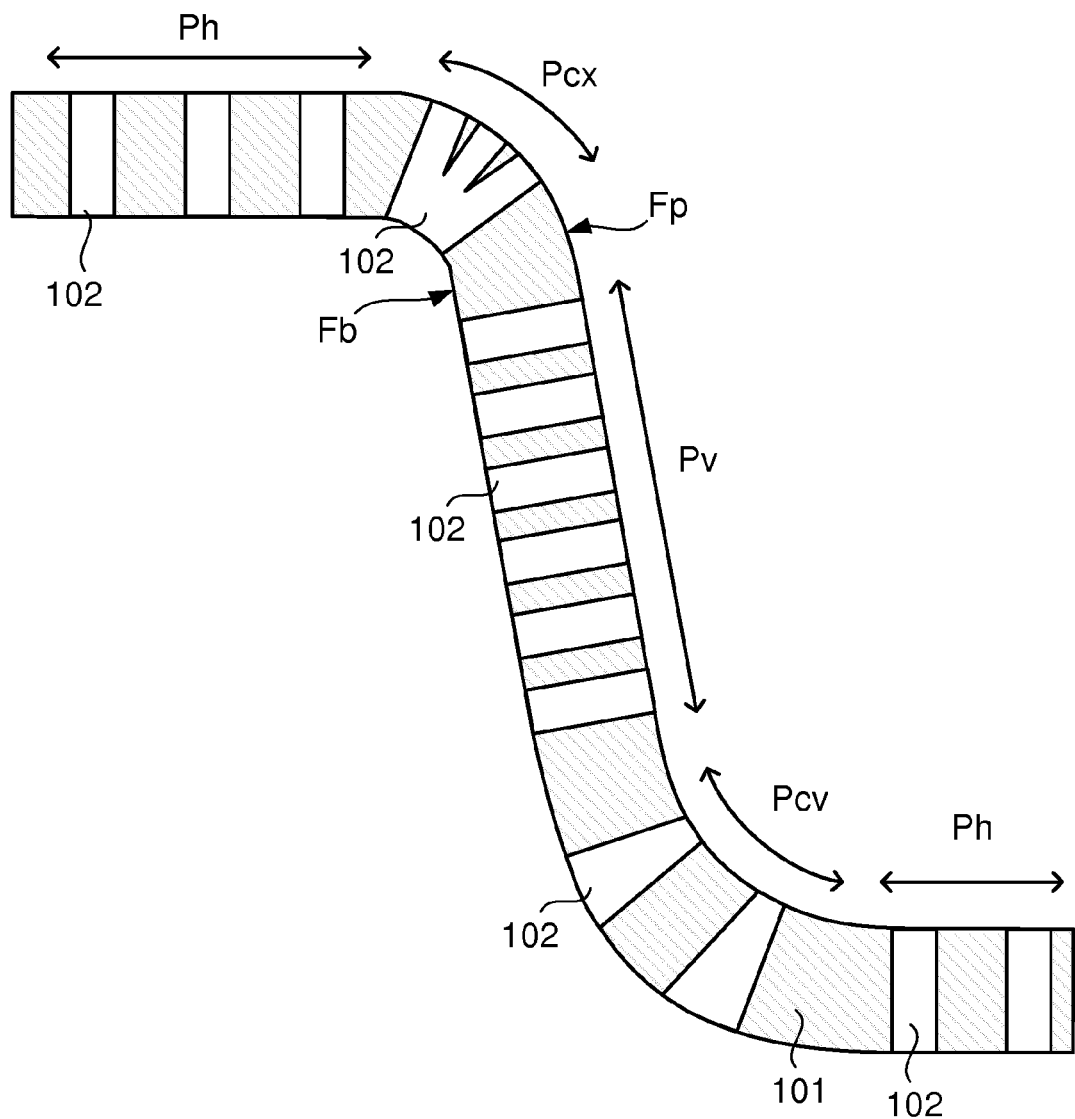
FIG. 3 schematically illustrates a part of a mold wall.

FIG. 3 schematically illustrates a part of a mold wall with the product face facing upwardly/to the right and with the back face facing downwardly/to the left.

The mold wall portion of FIG. 3 may present a horizontal mold wall portion Ph, i.e. mold wall portions that are horizontal +/−45°, preferably +/−30° or +/−15°, during a main operating phase of the mold. Such horizontal mold wall portions may be planar or substantially planar. For example, such substantially planar mold wall portions may be curved so as to deviate from a plane by less than 10%, preferably less than 5%, along any direction in the plane.

The mold wall portion may also present a convex mold wall portion Pcx, i.e. a mold wall portion having a convex product face Fp.

It is noted that the convex mold wall portion may be convex in one or two mutually orthogonal directions.

The mold wall portion may also present a vertical mold wall portion Pv, i.e. a mold wall portion that is vertical +/−45°, preferably +/−30° or +/−15°, during a main operating phase of the mold. Such vertical mold wall portions may be planar or substantially planar. For example, a substantially planar mold wall portion may be curved so as to deviate from a plane by less than 10%, preferably less than 5%, along any direction in the plane.

The mold wall portion may also present a concave mold wall portion Pcv, i.e. a mold wall portion having a concave product face Fp.

For the purpose of the present disclosure, the term "porosity" is defined as ratio of channel opening area to total wall area (including the channel openings) of a predetermined wall portion.

The pore openings at the product face may have a major diameter of 0.25 mm to 2 mm. The pore openings at the back face may have a major diameter of 0.3 to 4 mm.

Pore openings at the product face Fp may thus have an opening area of 0.045-3.2 mm$^2$ on the product face, preferably 0.045-2 mm$^2$ or 0.050-1 mm$^2$.

Pore openings at the back face Fb may thus have an opening area of 0.45-13 mm$^2$, preferably 0.1-5 mm$^2$ or 0.3-2 mm$^2$.

Hence, a ratio of back face opening area to product face opening area may be on the order of 1.1 to 6, preferably 1.2 to 5 or 1.4 to 4.

The convex mold wall portion Pcx may present the greatest porosity of all mold wall portions, Preferably, the convex mold wall portion may have a porosity of 10% to 90%, preferably 20% to 60%.

The vertical mold wall portion Pv may present lower porosity than the convex mold wall portion Pcx. Preferably, the vertical mold wall portion may have a porosity of 15% to 80%, preferably 25% to 60%.

The horizontal mold wall portion Ph may present lower porosity than the vertical mold wall portion Pv. Preferably, the horizontal mold wall portion Ph may have a porosity of 20% to 75%, preferably 30% to 55%.

The concave mold wall portion Pcv may present lower porosity than the horizontal mold wall portion Ph. Preferably, the concave mold wall portion Pcv may have a porosity of 1% to 70%, preferably 35% to 50%.

A mold as described above may be produced in an additive manufacturing process, such as a 3D printing process. Such an additive manufacturing process may comprise selective sintering of a powdery material having particles of an average size of 1-50 microns, preferably 5-30 microns. During the sintering process, the powdery material is completely melted through the addition of energy by means of a laser beam or an electron beam.

The material from which the mold is being made may be a metal or a metal alloy. Examples of such materials include, but are not limited do titanium and titanium alloys and aluminum, aluminum alloys, copper and copper alloys, bronze, brass, cobalt and chrome alloys and stainless steel.

In the alternative, the material may be a polymeric material, such as a plastic material.

Through such a forming process, it is possible to achieve a porous mold that presents well defined channels connecting the product face Fp with the back face Fb, with the material between the channels being homogenous and at least 95%, preferably 99% or 99.9% free from voids.

Referring to FIGS. 1a-1d above, it is noted that one or more of the tools 10, 20, 30, 40 may be formed according to the disclosure herein.

It is moreover noted that for example the pickup tool 10 and/or the transfer tool 20 may be formed with thinner walls and/or of a material having a lower melting point, than the pressing tools 30, 40.

The tool may be produced as a complete tool or as at least two tool parts, which are connected by soldering, welding, glue or fusing.

Moreover, the tool may be formed as a pair of tool parts with a hinge mechanism connecting the tool parts. A tool thus formed may allow for the production of even more complex products.

Figure 4:
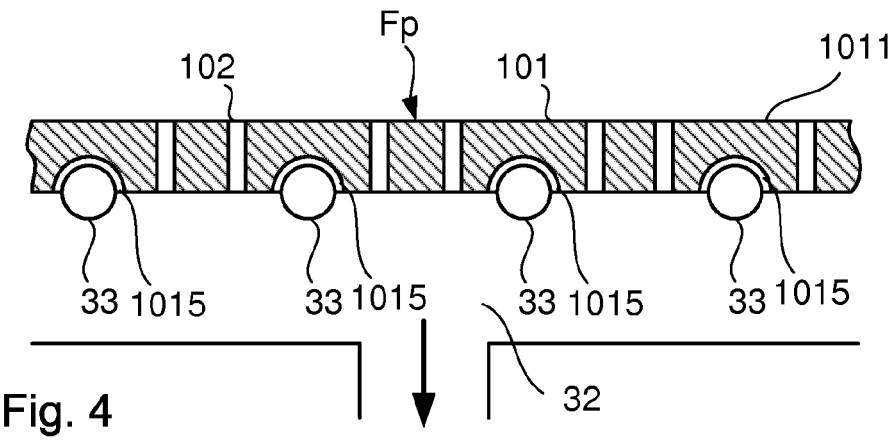
FIG. 4 schematically illustrates a part of a press mold according to a first embodiment.

FIG. 4 schematically illustrates a part of a press mold wall portion according to a first embodiment. FIG. 4 is directed to a male mold, but it is understood that the same design may be used for a female mold.

The press mold presents a mold wall 101 having recesses 1015, in which heating elements 33 are arranged. The mold wall 101 presents channels 102, which may be formed according to the disclosure of any of FIGS. 2a-3.

The recesses and thus the heating elements may be formed by elongate leads for resistive heating or channels for conducting a heated liquid or gas. In the alternative, the recesses may receive magnetic bodies, which can be heated through induction. Such magnetic bodies may be formed as discrete islands or as one or more elongate rods.

The recesses and heating elements may span all or part of the back face. Sections of the recesses and thus the heating elements may be spaced from each other as deemed necessary.

The recesses 1015 may extend into the mold wall from the rear face thereof. Non limiting examples of a distance by which they may extend into the mold wall may be about ¾, ½ or ¼ of the mold wall thickness at the relevant wall portion.

With the recesses being open towards the rear face, the heating elements 33 may be inserted after the mold wall portion has been produced. It is also possible to replace the heating elements 33 if necessary.

In this embodiment, the rear face Fb is open towards the vacuum chamber 32, in which a vacuum may be drawn as indicated by the arrow in FIG. 4.

Figure 5:
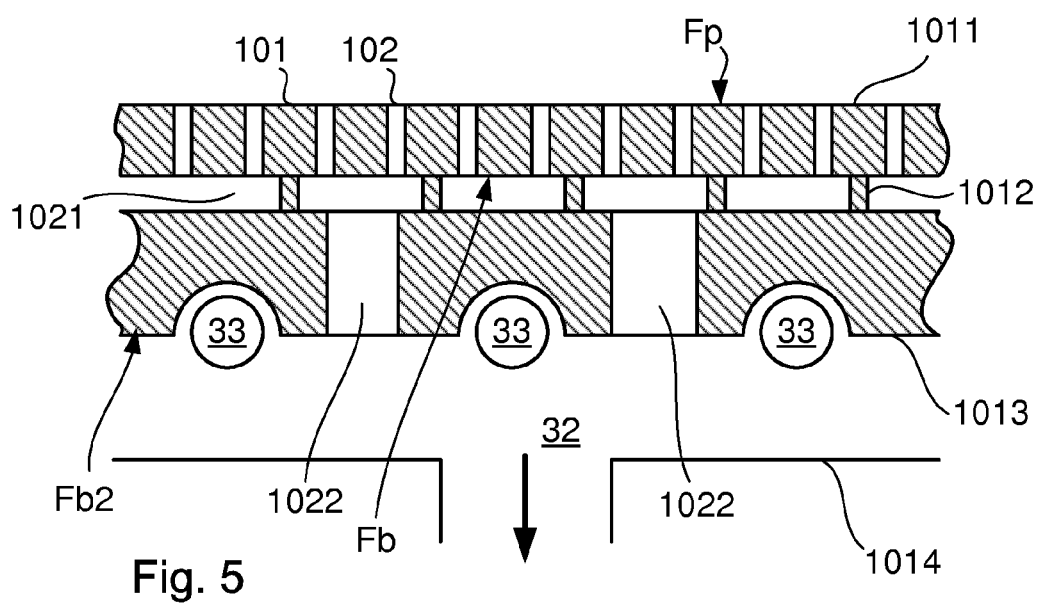
FIG. 5 schematically illustrates a part of a press mold according to a second embodiment.

FIG. 5 schematically illustrates a part of a press mold according to a second embodiment. FIG. 5 is directed to a male mold, but it is understood that the same design may be used for a female mold.

The press mold comprises an outer portion 1011 and a heater portion 1013, with a gap 1021 being provided there between. Spacers 1012 extend between the heater portion and the outer portion, spanning the gap 1021.

The channels 102 of the outer portion 1011 connect the product face Fp with the back face Fb. These channels may be formed according to the disclosure of any of FIGS. 2a-3.

A back face Fb2 of the heater portion 1013 may present recesses 1015, in which heating elements 33 may be arranged according to any of the alternatives mentioned with respect to FIG. 4.

The back face of the heater portion 1013 may be open towards the vacuum chamber 32.

Manifold channels 1022 also connect the gap 1021 with the back face Fb2 of the heater portion 1013. These manifold channels are of greater cross section than the channels 102 and of lower number. For example major widths of the manifold channels 1022 may be on the order of 10 to 1000 times those of the channels 102.

Moreover, the number of manifold channels may be on the order of 1/10 to 1/10000 that of the channels 102. A total flow cross section of the manifold channels 1022 may be equal to or greater than that of a total flow cross section of the channels 102. For example, the total flow cross section of the manifold channels 1022 may be on the order of 100-300% of that of the channels 102.

The outer portion 1011, the heater portion, 1013 and the spacers 1012 may be formed in one piece.

Figure 6:
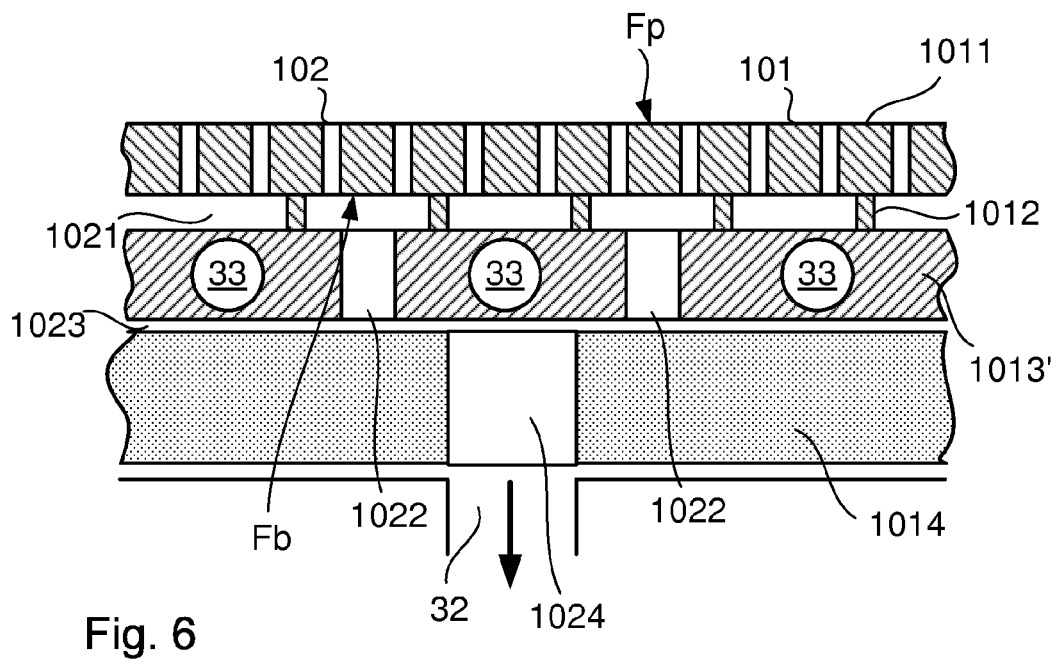
FIG. 6 schematically illustrates a part of a press mold according to a third embodiment.

FIG. 6 schematically illustrates a part of a press mold according to a third embodiment. This embodiment resembles that of FIG. 5 in that the mold wall presents an outer portion 1011, which is formed in one piece with the spacers 1012. The channels 102 may be formed as those described with respect to FIGS. 2a-3 and 5.

In the embodiment of FIG. 6, the heater portion 1013', and optionally the spacers 1012, are formed in a separate piece of material and from a different material than the outer portion 1011. Heating elements may be arranged in the heater portion in the same manner as was achieved in the heating portion 1013 of FIG. 5.

In the alternative, the heating elements 33 may be enclosed in the heating portion 1013.

In any event, manifold channels 1022 may run through the heater portion 1013' in the manner described with respect to FIG. 5.

The heater portion 1013' may comprise a body formed of a metallic material.

At the rear side of the heater portion 1013', an insulator 1014 may be provided. The insulator may bear against the heater portion 1013', or it may be slightly spaced therefrom, e.g. so as to allow distribution of vacuum from the inlet channel 1024, running through the insulator 1014, to the manifold channels 1022.

The insulator 1014 may be formed from a rigid, insulating material, such as a ceramic material.

The insulator may be enclosed by a casing, e.g. in order to protect it from damage.

Both pressing molds (e.g. male and female) may be provided with insulators. In such case, the insulators may, when the molds are brought together in a forming position, substantially enclose the molds, such that energy loss is reduced. A gap may be provided where the molds meet, for allowing steam to escape. As an alternative or additionally, through holes may be provided in one or both insulators for allowing steam to escape.

In embodiments where an additional body is arranged near the back face of the mold, such as where heaters 1013, 1013' are provided, spacers may transfer some of the pressure applied to the product face towards the additional body.

Typically less than 95% of pressure applied to the product face may be transferred to the additional body, preferably less than 90%, less than 80%, less than 70%, less than 50%, less than 30% or less than 10%. The non-transferred portion of the pressure may be absorbed by the mold due to its own rigidity.

The pressure applied to the mold surface may, depending on application during the pressing step, be on the order of at least 100 kPa, at least 25 kPa, at least 450 kPa, at least 800 kPa or at least 1 mPa.

The product face and/or the back face may be surface treated, e.g. ground or polished, anodized or provided with a surface coating. Such treatments may be provided, e.g. in order to reduce the risk of corrosion as compared with the material from which the mold is made from. A surface treatment or coating may alternatively, or additionally, provide anti-stick properties, e.g. it may be more hydrophobic than the material from which the mold is made. As yet another option, the surface treatment or coating may provide a surface having increased hardness as compared to the material from which the mold is made.

The invention claimed is:

1. A method of molding a product from a pulp slurry, the method comprising:
   in a first step, providing a pickup tool, for picking up pulp from a pulp slurry, the pickup tool comprising a self-supporting pickup tool wall portion having a product face, for contacting the product, and a back face on the other side of the wall relative to the product face, the pickup tool wall portion presenting pores, which are provided by a plurality of channels extending through the pickup tool wall portion, from the product face to the back face;
   applying a vacuum to the back face of the pickup tool, and applying pulp slurry to the product face of the pickup tool;
   in a second step, providing a transfer tool for receiving an amount of pulp from the pickup tool, the transfer tool comprising a self-supporting transfer tool wall portion having a product face, for contacting the product, and a back face on the other side of the wall relative to the product face, the transfer tool wall portion presenting pores, which are provided by a plurality of channels extending through the tool wall portion, from the product face to the back face;

applying a vacuum to the back face of the transfer tool, and applying the pulp slurry from the pickup tool to the product face of the transfer tool; and in a third step, providing a pressing tool for pressing an amount of pulp to form a molded product, the pressing tool comprising a self-supporting pressing tool wall portion having a product face, for contacting the product, and a back face on the other side of the wall relative to the product face, the pressing tool wall portion presenting pores, which are provided by a plurality of channels extending through the tool wall portion, from the product face to the back face, the pressing tool forming part of a pressing arrangement comprising a male pressing tool and a female pressing tool, the male pressing tool and female pressing tool being movable relative one another between an open position and a pressing position;

applying a vacuum to the back face of at least one of the male or female pressing tool, applying the pulp slurry from the transfer tool to the product face of the male pressing tool or of the female pressing tool when the male pressing tool and the female pressing tool are in their open position, and when in the pressing position, heating at least one of the male or female pressing tool, and forcing the male pressing tool and the female pressing tools towards each other, such that the pulp slurry is pressed between product faces of the respective tool.

2. The method as claimed in claim 1, wherein the channels of the pickup tool are straight or curved with no more than one point of inflection.

3. The method as claimed in claim 1 or 2, wherein the channels of the transfer tool are straight or curved with no more than one point of inflection.

4. The method as claimed in claim 1, wherein the channels of the pressing tool are straight or curved with no more than one point of inflection.

5. The method as claimed in claim 1, further comprising:

providing a second transfer tool for receiving an amount of pulp from the female or male pressing tool, the second transfer tool comprising a self-supporting transfer tool wall portion having a product face, for contacting the product, and a back face on the other side of the wall relative to the product face, the transfer tool wall portion presenting pores, which are provided by a plurality of channels extending through the tool wall portion, from the product face to the back face;

applying a vacuum to the back face of the second transfer tool, and applying the pulp slurry from the female or male pressing tool to the product face of the second transfer tool; and providing a second pressing tool for pressing an amount of pulp to form a molded product, the second pressing tool comprising a self-supporting pressing tool wall portion having a product face, for contacting the product, and a back face on the other side of the wall relative to the product face, the pressing tool wall portion presenting pores, which are provided by a plurality of channels extending through the tool wall portion, from the product face to the back face, the second pressing tool forming part of a second pressing arrangement comprising a second male pressing tool and a second female pressing tool, the second male pressing tool and second female pressing tool being movable relative one another between an open position and a pressing position;

applying a vacuum to the back face of at least one of the second male or second female pressing tool, applying the pulp slurry from the second transfer tool to the product face of the second male pressing tool or of the second female pressing tool when the second male pressing tool and the second female pressing tool are in their open position, and when in the pressing position, heating at least one of the second male or second female pressing tool, and forcing the second male pressing tool and the second female pressing tools towards each other, such that the pulp slurry is pressed between product faces of the respective tool.

\* \* \* \* \*